(12) United States Patent
Xie et al.

(10) Patent No.: US 10,654,246 B2
(45) Date of Patent: May 19, 2020

(54) COMPOSITE ARTICLE AND METHODS THEREFOR

(71) Applicant: General Electric Company, Schenectady, NY (US)

(72) Inventors: Ming Xie, Beavercreek, OH (US); Mark Ernest Vermilyea, Niskayuna, NY (US); Bowden Kirkpatrick, Bennington, VT (US); Mitchell Harold Boyer, Cincinnati, OH (US); Elliott Keller Schulte, Hurst, TX (US); Benjamin Ferrell, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1335 days.

(21) Appl. No.: 13/687,117

(22) Filed: Nov. 28, 2012

(65) Prior Publication Data

US 2015/0314556 A1     Nov. 5, 2015

Related U.S. Application Data

(60) Provisional application No. 61/639,900, filed on Apr. 28, 2012.

(51) Int. Cl.
*B32B 5/12* (2006.01)
*F01D 25/24* (2006.01)
(Continued)

(52) U.S. Cl.
CPC ............... *B32B 5/12* (2013.01); *B29C 70/30* (2013.01); *B32B 37/14* (2013.01); *F01D 25/24* (2013.01);
(Continued)

(58) Field of Classification Search
CPC .. B32B 5/12; B32B 5/14; B32B 5/142; B32B 3/08; B32B 3/18; B32B 37/14; B32B 2250/44; B32B 2603/00; Y10T 29/49801
See application file for complete search history.

(56) References Cited

U.S. PATENT DOCUMENTS 4,051,289 A * 9/1977 Adamson ................ B29C 70/08
                                                      156/227
4,177,306 A * 12/1979 Schulz ................... B29C 70/085
                                                      428/107

(Continued)

FOREIGN PATENT DOCUMENTS

CN          86104661 A     12/1986
CN          1283149 A      2/2001
(Continued)

OTHER PUBLICATIONS

Unofficial English Translation of Chinese Office Action issued in connection with corresponding CN Application No. 201380022445.3 dated Oct. 10, 2015.

(Continued)

*Primary Examiner* — Christopher M Koehler
(74) *Attorney, Agent, or Firm* — General Electric; Kristi Davidson

(57) ABSTRACT

A method is provided for forming a composite article to have a primary composite structure and an integral secondary composite structure that extends out of a plane defined by the primary composite structure. The method includes laying-up first plies to construct the primary composite structure. The first plies contain continuous reinforcement material and extend from a first zone that will define the primary composite structure into a second zone that will define the secondary composite structure. During laying-up of the first plies, additional plies are interleaved with the first plies within the second zone but not the first zone. The additional (Continued)

plies originate within a build-up zone between the first and second zones and extend therefrom into the second zone. After interleaving the plies, the build-up zone is deformed to orient the second zone and form the secondary composite structure that extends out of the plane defined by the continuous reinforcement material of the first plies.

13 Claims, 3 Drawing Sheets

(51) Int. Cl.
  *B32B 37/14* (2006.01)
  *B29C 70/30* (2006.01)
(52) U.S. Cl.
  CPC ..... *B32B 2260/046* (2013.01); *B32B 2305/08* (2013.01); *B32B 2305/10* (2013.01); *F05D 2220/32* (2013.01); *F05D 2230/31* (2013.01); *F05D 2300/603* (2013.01); *Y10T 156/1023* (2015.01); *Y10T 428/24124* (2015.01)

(56) References Cited

U.S. PATENT DOCUMENTS

| | | | | |
|---|---|---|---|---|
| 5,866,272 | A | * | 2/1999 | Westre ............... B32B 3/12 244/119 |
| 5,939,007 | A | * | 8/1999 | Iszczyszyn ........... B29C 70/32 156/156 |
| 7,338,694 | B2 | | 3/2008 | Keith et al. |
| 2006/0188696 | A1 | * | 8/2006 | Grose ............... B32B 3/02 428/156 |
| 2008/0118683 | A1 | * | 5/2008 | Xie ............... F01D 25/005 428/34.5 |
| 2009/0022945 | A1 | * | 1/2009 | Carpentier ............ B32B 5/12 428/119 |
| 2009/0176066 | A1 | * | 7/2009 | Darrow .............. B29C 70/085 428/175 |
| 2009/0308477 | A1 | | 12/2009 | Geislinger et al. |
| 2011/0103726 | A1 | * | 5/2011 | Xie ................. F01D 5/06 384/295 |
| 2013/0129968 | A1 | * | 5/2013 | Weidmann ......... B29C 70/025 428/113 |
| 2014/0010986 | A1 | * | 1/2014 | Kirkpatrick ........ B29C 70/44 428/64.1 |

FOREIGN PATENT DOCUMENTS

| | | |
|---|---|---|
| DE | 2622163 A1 | 11/1977 |
| EP | 0213300 B1 | 12/1989 |
| EP | 1859958 | 11/2007 |
| EP | 2077183 | 7/2009 |
| FR | 2718074 A1 | 10/1995 |
| JP | 60224530 A | 11/1985 |
| JP | 2007268941 A | 10/2007 |
| WO | 20080149079 | 12/2008 |
| WO | 2010101741 A2 | 9/2010 |

OTHER PUBLICATIONS

Search Report and Written Opinion from corresponding PCT Application No. PCT/US2013/037095, dated Jul. 29, 2013.
Unofficial English Translation of Japanese Office Action issued in connection with corresponding JP Application No. 2015509031 dated Nov. 4, 2015.

* cited by examiner

COMPOSITE ARTICLE AND METHODS THEREFOR

CROSS REFERENCE TO RELATED APPLICATIONS

This application claims the benefit of U.S. Provisional Application No. 61/639,900 filed Apr. 28, 2012, the contents of which are incorporated herein by reference.

BACKGROUND OF THE INVENTION

The present invention generally relates to methods for fabricating composite structures. More specifically, this invention relates to a method of fabricating a composite article to have an integral composite secondary structure, for example, an integral flange of a composite casing for a turbomachine.

Composite materials generally comprise a fibrous reinforcement material embedded in a matrix material, which in the case of a polymer composite material is a polymer material (polymer matrix composite, or PMC). The fibrous reinforcement of a composite material serves as the secondary constituent of the material, while the matrix material protects the reinforcement, maintains the orientation of its fibers, and serves to dissipate loads to the reinforcement.

Composite materials have become increasingly popular for use in a variety of aerospace applications because of their durability and relatively light weight. Particular but nonlimiting examples include the use of PMC materials for fan casings for aircraft gas turbine engines. Although composite materials can provide superior strength and weight properties, designing flanges and other secondary features on structures fabricated from composite materials poses a challenge. As an example, composite structures having laminate constructions that contain continuous reinforcement materials are capable of exhibiting superior in-plane strength due to the presence of the continuous reinforcing fibers. As used herein, continuous reinforcement materials refer to continuous fibers or fiber bundles (tows) that are typically oriented to have a specific orientation (unidirectional) within a matrix material of a composite, for example, parallel to the load direction on the composite, in contrast to discontinuous fiber reinforcement materials made up of short fibers that are typically randomly dispersed in a matrix material. While composite structures containing continuous fiber reinforcement are capable of exhibiting superior in-plane strength, flanges and other secondary structures that extend out of the plane of the continuous reinforcing fibers lack continuous fibers at their points of attachment, or joints, with the primary composite structure. The lack of continuous fibers, as well as the likelihood of significant out-of-plane loads created by attachments to the flanges, may result in relatively weaker attachment joints that are susceptible to damage from increased stresses. Though it is possible to separately fabricate a flange and then attach the flange to a primary composite structure with a supplemental reinforcement structure, for example, additional fibers or metal brackets, the weight-saving benefits possible with the use of composite materials can be significantly reduced as a result.

In the case of composite casings of gas turbine engines, integral flanges constructed of fiber preform designs have been proposed to address structural weaknesses at the point of attachment. However, such fiber preform design options tend to be quite limited. Plies used in the construction of composite casings and their integral flanges are typically woven or braided preforms that limit fiber orientation, with the result that stiffness and strength cannot be readily optimized. The degree to which interleaving between fiber tows within the casing and within the flange body is also typically limited, resulting in limited resistance to delamination.

Accordingly, there is a need for improved techniques by which a composite structure can be fabricated to have an integral composite flange or other secondary composite structure with continuous fibers at points of attachment therebetween.

BRIEF DESCRIPTION OF THE INVENTION

The present invention provides a method for fabricating a composite article comprising a primary composite structure and at least one integral secondary composite structure, for example, a composite casing having an integral flange, and the composite article formed thereby, wherein continuous fibers are present within a region of attachment between the primary and secondary composite structures. The present invention further provides a method for fabricating a composite article comprising an internal build-up zone.

According to a first aspect of the invention, a method is provided for forming a composite article to have a primary composite structure and an integral secondary composite structure that extends out of a plane defined by a continuous reinforcement material within the primary composite structure. The method includes laying-up first plies to construct the primary composite structure. The first plies contain the continuous reinforcement material and extend from a first zone that will define the primary composite structure into a second zone that will define the secondary composite structure. During laying-up of the first plies, additional plies are interleaved with the first plies within the second zone but not the first zone so that the second zone contains both the first and additional plies. The additional plies originate within a build-up zone between the first and second zones and extend therefrom into the second zone. After interleaving the plies, the interleaved first and additional plies within the build-up zone are deformed to orient the second zone and form the secondary composite structure that extends out of the plane defined by the continuous reinforcement material of the first plies.

According to a second aspect of the invention, a composite article includes a primary composite structure comprising a continuous reinforcement material and an integral secondary composite structure that extends out of a plane defined by the continuous reinforcement material within the primary composite structure. The primary composite structure includes first plies that contain the continuous reinforcement material, and the secondary composite structure comprises the first plies and additional plies. The additional plies originate within a build-up zone between the primary composite structure and the secondary composite structure and extend therefrom into the secondary composite structure.

According to a third aspect of the invention, a method is provided for forming a composite article having a build-up zone. The method includes laying-up first plies to construct the composite article. During laying-up of the first plies, additional plies are interleaved with the first plies within the build-up zone but not the first zone so that the build-up zone contains both the first and additional plies.

A technical effect of the invention is the ability to fabricate a primary composite structure to have an integral composite secondary structure with a relatively strong attachment region with the primary composite structure without significantly increasing the weight of the composite article. In particular, it is believed that, by providing first plies with a continuous reinforcement material within the primary composite structure, continuing the first plies into the secondary composite structure, and interleaving additional plies with the first plies to form the secondary composite structure, the resulting composite article is capable of exhibiting enhanced joint strength between the first and second composite structures in comparison to prior attachment methods known in the art.

Other aspects and advantages of this invention will be better appreciated from the following detailed description.

DETAILED DESCRIPTION OF THE INVENTION

Figure 1:
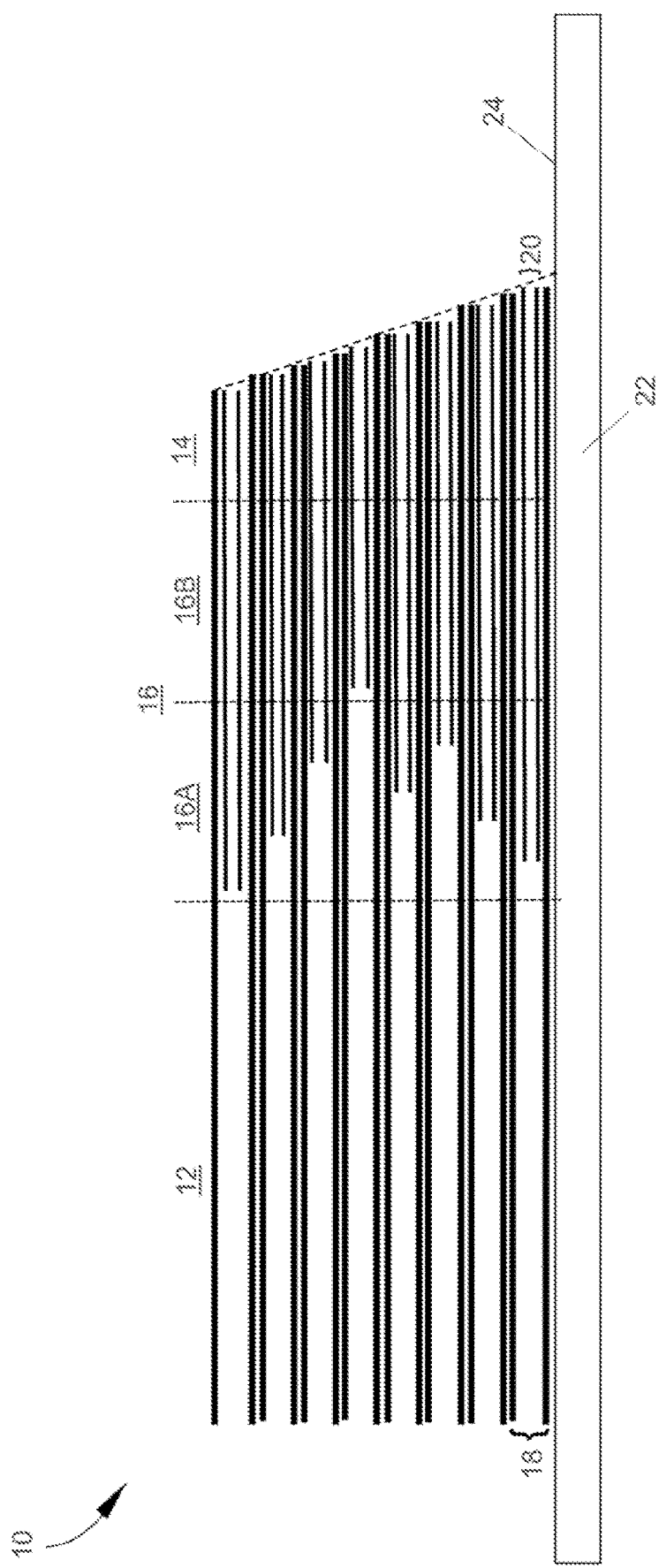
FIG. 1 is a schematic cross-sectional view representing the individual plies of a composite article in accordance with an aspect of this invention.

The present invention will be described in terms of processes for producing composite articles that are formed from a fiber-reinforced laminate material to comprise a primary composite structure that incorporates at least one integral secondary composite structure. The secondary composite structure extends out of a plane defined by continuous reinforcement material within the primary composite structure. While various applications are foreseeable and possible, applications of particular interest include those that require relatively light-weight components, for example, components of gas turbines, including aircraft gas turbine engines. Of particular interest are composite articles with integral composite flanges, for example, fan casings of aircraft gas turbine engines. Other possible secondary structures may include, but are not limited to, integral stiffening ring and structural bulkhead on the casing structures.

While the teachings of the invention can be extended to apply to a variety of composite materials, of particular interest are PMC materials. Furthermore, though the invention can make use of a wide variety of fiber-reinforced laminate materials, laminate materials believed to be of particular interest to the invention contain continuous reinforcement materials formed of one or more of the following: glass fibers, graphite fibers, carbon fibers, ceramic fibers, aromatic polyamide fibers such as poly(p-phenylenetherephtalamide) fibers (i.e. KEVLAR®). The fibers of the continuous reinforcement material may be present as individual fibers or, more preferably, as fiber bundles (tows), which as used herein refers to an untwisted bundle of continuous reinforcement fibers.

For the purpose of fabricating a PMC material, the laminate materials further comprise a liquid resin that, following curing or solidification of the resin, will form a solid matrix material for the reinforcement material within the final composite article. Resins can be generally classified as thermosets or thermoplastics. Thermoplastic resins are generally categorized as polymers that can be repeatedly softened and flowed when heated and hardened when sufficiently cooled due to a physical rather than chemical change. Notable example classes of thermoplastic resins that can find use with the invention include nylons, thermoplastic polyesters, polyaryletherketones, and polycarbonate resins. Specific examples of high-performance thermoplastic resins that have been contemplated for use in aerospace applications include polyetheretherketone (PEEK), polyetherketoneketone (PEKK), polyetherimide (PEI) and polyphenylene sulfide (PPS). In contrast, once fully cured into a hard rigid solid, thermoset resins do not undergo significant softening when heated, but instead thermally decompose when sufficiently heated. Notable examples of high-performance thermoset resins that have been contemplated for use in aerospace applications include epoxy and polyester resins.

According to a preferred aspect of the invention, the primary composite structure can be fabricated to have the integral secondary structure defined at least in part by continuous fibers or fiber bundles (tows) of the continuous reinforcement material that originate from within the body of the primary composite structure. A fiber-reinforced laminate material (structure) comprising multiple prepreg plies containing the continuous fibers or fiber tows can be laid-up to construct the primary composite structure. As referred to herein, a ply is an individual layer containing a continuous reinforcement material, and which is capable of providing complete coverage of a surface region, for example, an underlying ply of the laminate material. The continuous reinforcement material within successive plies of the primary composite structure preferably have different fiber orientation angles. Following lay-up, plies at one end of the primary composite structure are formed out of the plane of the plies (and their continuous reinforcement material) to define the secondary structure.

The secondary structure is further constructed to contain additional prepreg plies that are interleaved with plies from the primary composite structure. The additional plies of the secondary structure also contain continuous reinforcement material. The additional plies of the secondary structure can have the same fiber orientation relative to adjacent plies from the primary composite structure with which the additional plies are interleaved. For the purpose of promoting the stiffness and/or strength of the secondary structure and its attachment to the primary structure, the additional plies of the secondary structure preferably have different fiber orientation angles relative to each adjacent ply of the primary composite structure with which an additional ply is interleaved. The thicknesses of the additional plies that form the secondary structure can also be tailored to increase the thickness of the secondary structure. These additional plies can also originate at various locations within the primary structure relative to the secondary structure, resulting in the ends of the additional plies being staggered to minimize stress concentration. Build-up of the primary composite structure and its secondary composite structure can be facilitated by directly depositing plies of individual fibers or fiber tows onto a tool surface, for example, with the use of an automated fiber placement machine and filament winding machine. These machines allow for economical placement of the fiber tows in varying fiber orientation and with varying degrees of interleaving.

FIG. 1 schematically represents a preliminary composite structure 10 of a type described above, in which shell plies 18 denote a first group of plies within a shell zone 12 that will define at least a portion of a primary composite structure, and portions of the shell plies 18 within a flange zone 14 will be formed out of the plane of the shell plies 18 to define a secondary composite structure, for example, a flange. A build-up zone 16 is defined between the shell and flange zones 12 and 14, within which the shell plies 18 will be deformed (not shown) to result in portions of the shell plies 18 within the flange zone 14 being oriented out of the plane, for example, perpendicular to, the shell zone 12 (and, therefore, the primary composite structure within the shell zone 12). FIG. 1 represents the plies 18 as laid-up on a surface 24 of a tool 22.

As evident from FIG. 1, the build-up zone 16 comprises a tapered zone 16A and a uniform thickness zone 16B. The flange and build-up zones 14 and 16 contain additional build-up plies (layers) 20 that are interleaved with shell plies 18, which can be seen in FIG. 1 to be continuous throughout the entire extent of the shell and flange zones 12 and 14. Unlike conventional techniques known in the art, one or more build-up plies 20 are represented as preferably interleaved within each individual shell ply 18 rather than between two adjacent shell plies 18. The build-up plies 20 are represented in FIG. 1 as originating at different locations within the tapered zone 16A of the build-up zone 16, preferably for the purpose of achieving a substantially uniform thickness within the uniform thickness zone 16B of the build-up zone 16, as well as within the flange zone 14. The ends of the continuous shell plies 18 and the interleaved build-up plies 20 within the Flange Zone 14 are preferably chamfered or otherwise terminate in a manner as represented in FIG. 1 so that, after forming the secondary composite structure from the plies 18 and 20 within the flange zone 14, the ends of the plies 18 and 20 forming the secondary composite structure will define an end surface that is substantially parallel to the surface 24 of a tool 22 on which the preliminary composite structure 10 is fabricated. Chamfering the plies 18 and 20 within the flange zone 14 allows the continuous reinforcement material (fibers or fiber tows) closer to the tool surface 24, whether shell plies 18 or build-up plies 20, to have a greater radius of curvature when bent and yet be flush with the ends of plies 18 and 20 farther from the tool surface 24.

Figure 2:
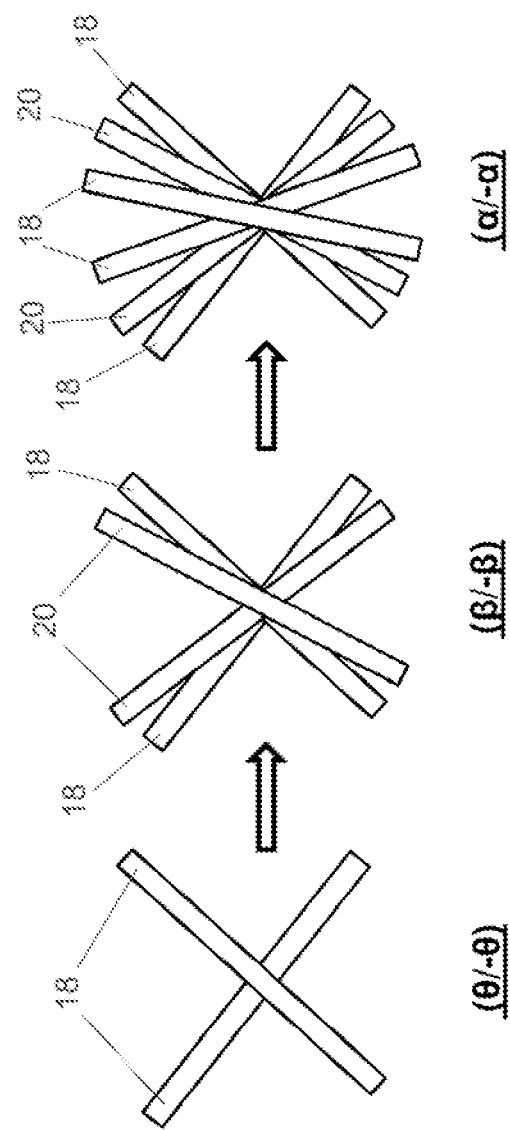
FIG. 2 a schematic view representing different ply orientations that may be incorporated into build-up and flange zones of the preliminary composite article of FIG. 1.

FIG. 2 schematically represents a manner in which different ply orientations can be incorporated into the flange and build-up zones 14 and 16 by interleaving shell plies 18 and build-up plies 20 to promote the strength of the secondary composite structure (defined by the flange zone 14) and its attachment (defined by the build-up zone 16) to the primary composite structure (defined by the shell zone 12). In the example, a build-up ply 20 having a β-β fiber orientation is interleaved within a shell ply 18 between fibers having θ-θ and α-α fiber orientations to result in the combination of fiber orientations represented at the right-hand end of FIG. 2.

Suitable fiber diameters, tow diameters, and center-to-center fiber/tow spacings within the continuous reinforcement materials of the shell and build-up plies 18 and 20 will depend on the particular application, the thicknesses of the plies 18 and 20, and other factors. In particular embodiments of the invention, about one to about eight fiber tows per inch (about 2.5 to 20 cm) are used in the shell and build-up plies 18 and 20 to construct the preliminary composite structure 10, and each fiber tow may comprise from about 6000 to about 48000 fiber filaments. Though these fiber filaments may have any thickness, in particular embodiments the thickness of the fiber filaments may be from about 0.003 to about 0.010 inches (about 0.075 to about 0.25 mm).

Once the plies 18 and 20 are laid-up on the tool surface 24, the secondary composite structure can be formed by deforming the build-up zone 16 and portions of the plies 18 and 20 therein to orient the flange zone 14 out of the plane of the shell zone 12 and the plies 18 therein, after which the preliminary composite structure 10 may be debulked and cured. Those skilled in the art will understand how to determine the proper debulk and final cure parameters based on such factors as part size and resin utilized. At the end of the final cure, the tooling 22 may be removed to yield the resulting PMC article, including the primary and secondary composite structures discussed above.

From the above, it should be appreciated that an integral flange (or other secondary structure) fabricated in the manner described above is capable of being lighter in weight than a flange that is separately formed and then bolted or bonded to a composite casing (or other primary structure). A majority of the fiber tows within the flange can be continuous fibers that originate within the casing, providing a higher load-carrying capability than a construction containing discontinuous fibers. Furthermore, a flange constructed of individual fiber tows with various fiber orientations and various degrees of interleaving is capable of providing much greater design flexibility than would be possible if textile preform sheets (e.g., weave and braid) were used. An additional advantage is that the individual fiber tows can be deposited with automated machines, thereby reducing fabrication costs as compared to processes relying on hand lay-up.

Figure 3:
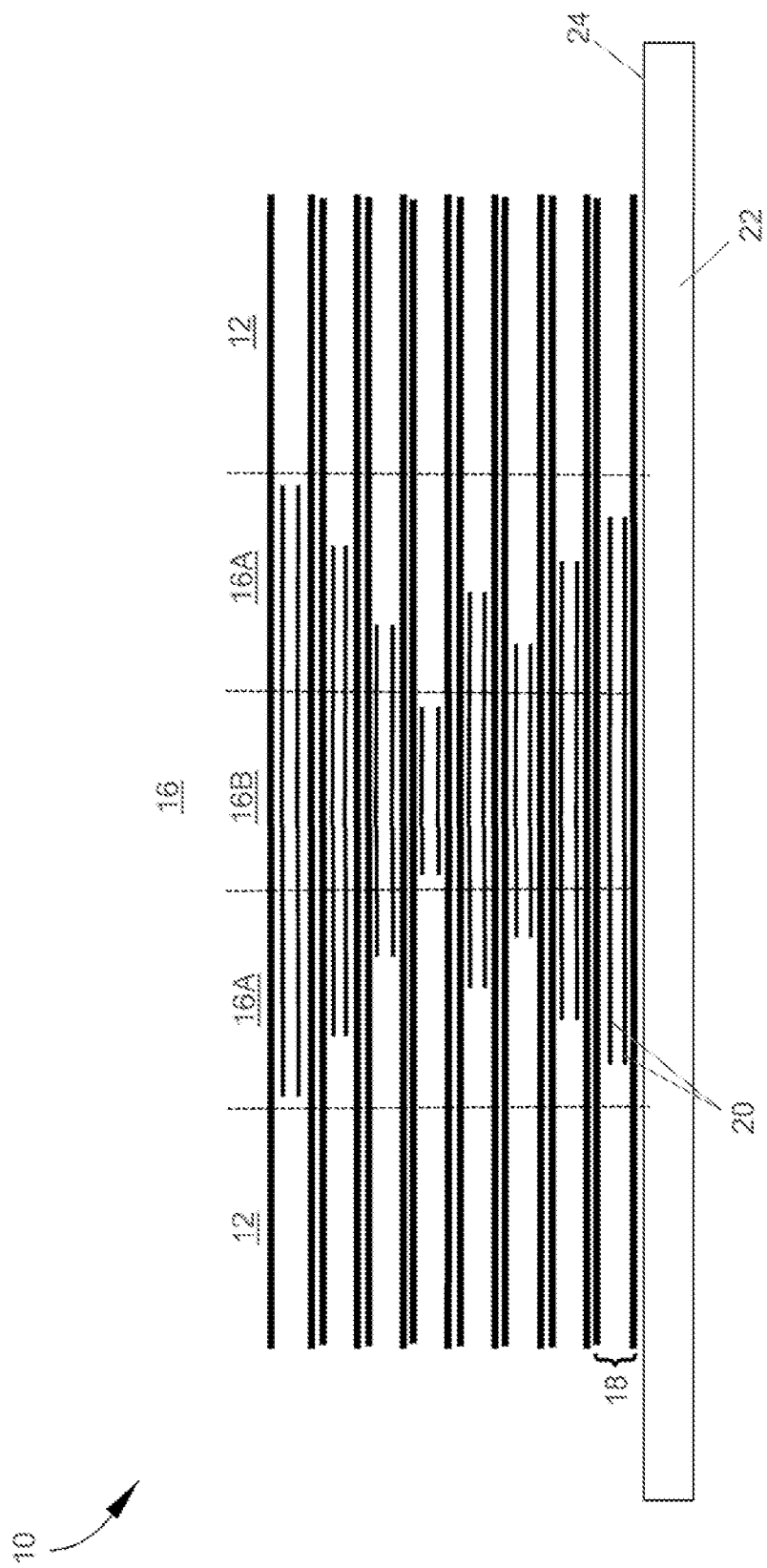
FIG. 3 is a schematic cross-sectional view representing the individual plies of a composite article in accordance with an aspect of this invention.

According to an alternative embodiment of the invention, the composite structure 10 having shell plies 18 may be formed by the above process to include a local build-up (thickening) zone 16, represented in FIG. 3. Although the structure 10 does not form a secondary structure as in the previous embodiment, it is foreseeable that having the build-up zone 16 may still be desirable in some applications, such as when the structure requires a cut-out or needs improved stiffness. The local build-up zone 16 comprises two tapered zones 16A and a uniform thickness zone 16B.

While the invention has been described in terms of specific embodiments, it is apparent that other forms could be adopted by one skilled in the art. For example, the physical configuration of the primary and/or secondary composite structures could differ from that shown, and materials and processes other than those noted could be used. Therefore, the scope of the invention is to be limited only by the following claims.

The invention claimed is:

1. A method of forming a composite article to have a primary composite structure and an integral secondary composite structure that extends out of a plane defined by a continuous reinforcement material within the primary composite structure, the method comprising:

laying-up first plies consisting of individual non-woven fibers or fiber tows via an automated fiber placement machine to construct the primary composite structure, the first plies containing the continuous reinforcement material and extending from a first zone that will define the primary composite structure into a second zone that will define the secondary composite structure;

during laying-up of the first plies, interleaving additional plies consisting of individual non-woven fibers or fiber tows via an automated fiber placement machine with the first plies within the second zone but not the first zone so that the second zone contains both the first and additional plies, the additional plies originating within a build-up zone between the first and second zones and extending there from into the second zone, the first and additional plies both terminating in a manner that ends of the first and additional plies define an end surface; and then deforming the build-up zone and the interleaved first and additional plies therein at the end surface to orient the second zone and form the secondary composite structure into a flange that extends out of the plane defined by the continuous reinforcement material of the first plies.

2. The method according to claim 1, wherein the continuous reinforcement material comprises unidirectional fibers and the unidirectional fibers within successive individual plies of the first plies have different fiber orientation angles.

3. The method according to claim 1, wherein the additional plies contain a second continuous reinforcement material.

4. The method according to claim 3, wherein the second continuous reinforcement material of at least one of the additional plies has a different fiber orientation angle than the continuous reinforcement material of at least one of the first plies with which the at least one additional ply is interleaved.

5. The method according to claim 1, wherein each of the additional plies is interleaved within an individual ply of the first plies.

6. The method according to claim 5, wherein the additional plies contain a second continuous reinforcement material, and the second continuous reinforcement material of at least one of the additional plies has a different fiber orientation angle than the continuous reinforcement material of one of the first plies within which the at least one additional ply is interleaved.

7. The method according to claim 1, wherein the additional plies increase the thickness of the secondary composite structure relative to the primary composite structure.

8. The method according to claim 1, wherein the additional plies originate at different locations within the build-up zone so that ends of the additional plies are staggered within the build-up zone to minimize stress concentration in a joint region defined by the build-up zone between the primary and secondary composite structures.

9. The method according to claim 1, wherein the first and additional plies have ends that terminate at different locations within the second zone so that an end defined by the first and additional plies within the second zone is chamfered following the lay-up step.

10. The method according to claim 9, wherein the end defined by the first and additional plies within the second zone defines an end surface that is substantially parallel to the first plies forming the primary composite structure following the deforming step.

11. The method according to claim 1, wherein the composite article is a polymer matrix composite article.

12. The method according to claim 1, wherein the composite article is a fan casing of a gas turbine engine and the integral secondary composite structure is a flange of the fan casing.

13. A composite article having the primary composite structure and the integral secondary composite structure formed by the method of claim 1.

* * * * *